United States Patent
Liu et al.

(10) Patent No.: US 10,027,513 B2
(45) Date of Patent: Jul. 17, 2018

(54) ANTI-ALIASING CHANNEL ESTIMATION APPARATUS AND METHOD AND RECEIVER

(71) Applicant: Fujitsu Limited, Kawasaki-shi, Kanagawa (JP)

(72) Inventors: Bo Liu, Beijing (CN); Lei Li, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/480,962

(22) Filed: Apr. 6, 2017

(65) Prior Publication Data

US 2017/0295036 A1   Oct. 12, 2017

(30) Foreign Application Priority Data

Apr. 7, 2016   (CN) .......................... 2016 1 0213116

(51) Int. Cl.
| | |
|---|---|
| H04L 25/02 | (2006.01) |
| H04L 7/00 | (2006.01) |
| H04L 5/00 | (2006.01) |
| H04B 17/336 | (2015.01) |
| H04L 27/26 | (2006.01) |
| H04L 27/00 | (2006.01) |

(52) U.S. Cl.
CPC ....... H04L 25/0204 (2013.01); H04B 17/336 (2015.01); H04L 5/006 (2013.01); H04L 7/0079 (2013.01); H04L 27/265 (2013.01); H04L 2027/0036 (2013.01)

(58) Field of Classification Search
CPC ... H04L 25/0204; H04L 5/006; H04L 7/0079; H04L 2027/0036; H04L 27/265; H04B 17/336
See application file for complete search history.

(56) References Cited

U.S. PATENT DOCUMENTS

| | | | | |
|---|---|---|---|---|
| 7,139,320 | B1 * | 11/2006 | Singh | .................... H04L 5/0048 375/260 |
| 7,184,495 | B2 * | 2/2007 | Thomson | ............ H04L 27/2657 375/340 |
| 8,351,526 | B2 * | 1/2013 | Butussi | ............... H04L 27/2647 375/259 |
| 8,472,575 | B2 * | 6/2013 | Yee | ........................ H04B 1/707 375/346 |
| 9,596,118 | B2 * | 3/2017 | Dore | ..................... H04L 27/264 |

(Continued)

*Primary Examiner* — Kenneth Lam
(74) *Attorney, Agent, or Firm* — Staas & Halsey LLP

(57) ABSTRACT

An anti-aliasing channel estimation apparatus and method and a receiver where the anti-aliasing channel estimation method includes: performing clock recovery and data synchronization on a received multicarrier signal with channel aliasing, to obtain a synchronized time-domain signal and a sampling phase; calculating an estimation signal after passing through a channel and being aliased based on a training sequence and the sampling phase, and obtaining a channel response and an aliasing signal response of each subcarrier of the multicarrier signal based on the estimation signal and the frequency-domain signal. Therefore, channel estimation may be performed on the multicarrier signal with channel aliasing, influence of the channel aliasing on the bit error rate may be lowered, and transmission quality of the system may be improved.

10 Claims, 6 Drawing Sheets

(56) References Cited

U.S. PATENT DOCUMENTS

2006/0233269 A1* 10/2006 Bhushan ............... H04L 25/022
                                                    375/260
2007/0253497 A1* 11/2007 Chen .................. H04L 27/2679
                                                    375/260
2008/0101496 A1*  5/2008 Gaikwad .............. H04L 1/0631
                                                    375/267

* cited by examiner

ANTI-ALIASING CHANNEL ESTIMATION APPARATUS AND METHOD AND RECEIVER

CROSS-REFERENCE TO RELATED APPLICATIONS

This application claims the benefit of Chinese Application No. 201610213116.2, filed Apr. 7, 2016, in the Chinese Intellectual Property Office, the disclosure of which is incorporated herein by reference.

BACKGROUND

1. Field

Embodiments of this disclosure relate to the field of multicarrier communications, and in particular to an anti-aliasing channel estimation apparatus and method and a receiver.

2. Description of the Related Art

Discrete multi-tone (DMT) modulation is a high-efficiency optical communication system, which is characterized in that after a channel is divided into multiple subcarriers, different modulation formats are allocated according to signal to noise ratios (SNRs) of the respective subcarriers. Hence, it is needed to accurately estimate channel response and noise strength of each subcarrier, so as to determine an optimal modulation format and power allocation for each subcarrier.

It should be noted that the above description of the background is merely provided for clear and complete explanation of this disclosure and for easy understanding by those skilled in the art. And it should not be understood that the above technical solution is known to those skilled in the art as it is described in the background of the disclosure.

SUMMARY

Additional aspects and/or advantages will be set forth in part in the description which follows and, in part, will be apparent from the description, or may be learned by practice of the embodiments.

However, it was found by the inventors that in an existing multicarrier system, multicarrier signal received at a receiving device has channel aliasing. Influenced by an aliased signal, a channel response estimated according to an existing method cannot correctly reflect a condition of the channel, thus, the transmission quality of the system cannot be further improved.

Embodiments of the disclosure provide an anti-aliasing channel estimation apparatus and method and a receiver, in which by estimating a channel response and an aliased signal response for each subcarrier, channel estimation may be accurately performed on a multicarrier signal with channel aliasing.

According to a first aspect of the embodiments of the disclosure, there is provided an anti-aliasing channel estimation apparatus, including:

a synchronizing unit configured to perform clock recovery and data synchronization on a received multicarrier signal with channel aliasing, to obtain a synchronized time-domain signal and a sampling phase;

a signal transforming unit configured to transform the multicarrier signal from the time-domain signal into a frequency-domain signal by using fast Fourier transform;

an equalizing unit configured to equalize the frequency-domain signal based on the sampling phase and an equalization coefficient; and a channel estimating unit configured to calculate an estimation signal after passing through a channel and being aliased based on a training sequence and the sampling phase, and obtain a channel response and an aliasing signal response of each subcarrier of the multicarrier signal based on the estimation signal and the frequency-domain signal.

According to a second aspect of the embodiments of the disclosure, there is provided an anti-aliasing channel estimation method, including:

performing clock recovery and data synchronization on a received multicarrier signal with channel aliasing, to obtain a synchronized time-domain signal and a sampling phase;

transforming the multicarrier signal from the time-domain signal into a frequency-domain signal by using fast Fourier transform;

equalizing the frequency-domain signal based on the sampling phase and an equalization coefficient; and calculating an estimation signal passing through a channel and being aliased based on a training sequence and the sampling phase, and obtaining a channel response and an aliasing signal response of each subcarrier of the multicarrier signal based on the estimation signal and the frequency-domain signal.

According to a third aspect of the embodiments of the disclosure, there is provided a receiver of a multicarrier disclosure, which receives a multicarrier signal with channel aliasing, the receiver comprising the anti-aliasing channel estimation apparatus as described above.

An advantage of the embodiments of the disclosure exists in that a channel response and an aliasing signal response of each subcarrier of the multicarrier signal are calculated based on the sampling phase. Therefore, channel estimation may be performed on the multicarrier signal with channel aliasing, influence of the channel chasing on the bit error rate may be lowered, and transmission quality of the system may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide, further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings.

In these embodiments, description shall be given taking a DMT system as an example, and furthermore, they are also applicable to an orthogonal frequency division multiplexing (OFDM) system. However, this disclosure is not limited thereto, and all multicarrier systems with channel aliasing may be used.

Embodiment 1

The embodiment of this disclosure provides an anti-aliasing channel estimation apparatus, configured in a receiving device of a multicarrier system.

Figure 1:
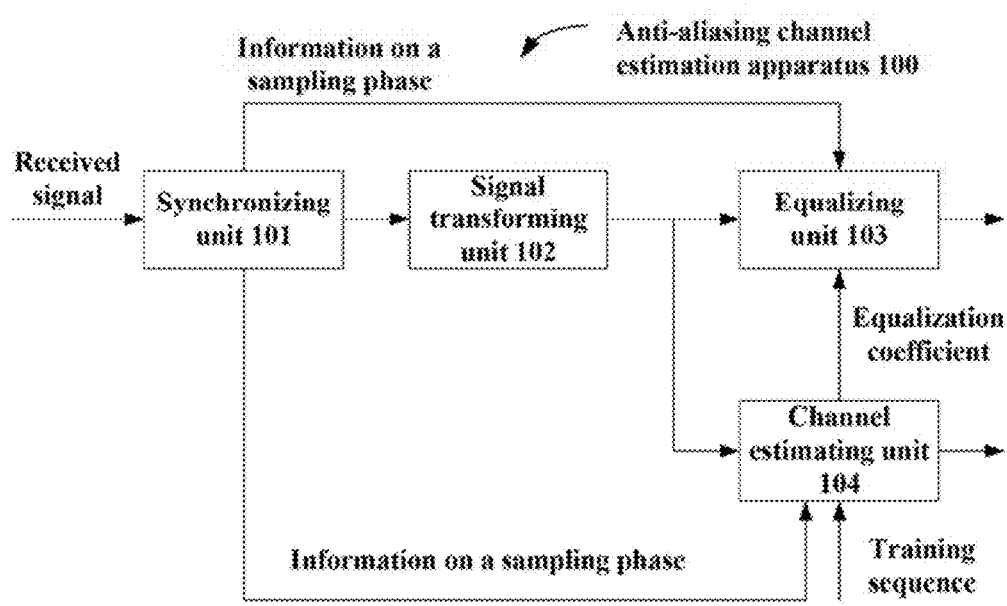
FIG. 1 is a schematic diagram of the anti-aliasing channel estimation apparatus according to Embodiment 1 of this disclosure.

FIG. 1 is a schematic diagram of the anti-aliasing channel estimation apparatus according to Embodiment 1 of this disclosure. As shown in FIG. 1, the anti-aliasing channel estimation apparatus 100 includes:

a synchronizing unit 101 configured to perform clock recovery and data synchronization on a received multicarrier signal with channel aliasing, to obtain a synchronized time-domain signal and a sampling phase;

a signal transforming unit 102 configured to transform the multicarrier signal from the time-domain signal into a frequency-domain signal by using fast Fourier transform (FFT);

an equalizing unit 103 configured to equalize the frequency-domain signal based on the sampling phase and an equalization coefficient; and a channel estimating unit 104 configured to calculate an estimation signal passing through a channel and being aliased based on a training sequence and the sampling phase, and obtain a channel response and an aliasing signal response of each subcarrier of the multicarrier signal based on the estimation signal and the frequency-domain signal.

In this embodiment, the multicarrier signal is transmitted by a transmitting device of a multicarrier system, and has channel aliasing after being transmitted via a channel, that is, the multicarrier signal received by the receiving device contain an aliased signal. Different from the prior art, the embodiment of this disclosure may calculate an aliased signal response by using the sampling phase, thereby accurately reflecting a condition of the channel.

In this embodiment, the synchronizing unit 101 may be a module for clock recovery and data synchronization, and may synchronize received data and measure the sampling phase by processing the received data. The signal transforming unit 102 is an FFT module, which transforms a synchronized and necessarily processed (such as removing a cyclic prefix, etc.) time-domain signal into a frequency-domain signal. And the equalizing unit 103 is an equalization module, which may equalize the received data according to the equalization coefficient outputted by the channel estimating unit 104 and the sampling phase information outputted by the synchronizing unit 101.

And the channel estimating unit 104 may be a channel measurement module, which, for example, may operate before normal data transmission. The channel estimating unit 104 may use the training sequence (such as the multicarrier signal transmitted by the transmitting device) and the sampling phase information outputted by the synchronizing unit 101 to measure the channel response and the aliased signal response by using, for example, a minimum mean square error (MMSE) algorithm; and furthermore, the equalization coefficient may be calculated, and the signal to noise ratios of the respective subcarriers may be calculated by including the equalization coefficient in noises.

The channel estimating unit 104 shall be further explained below.

Figure 2:
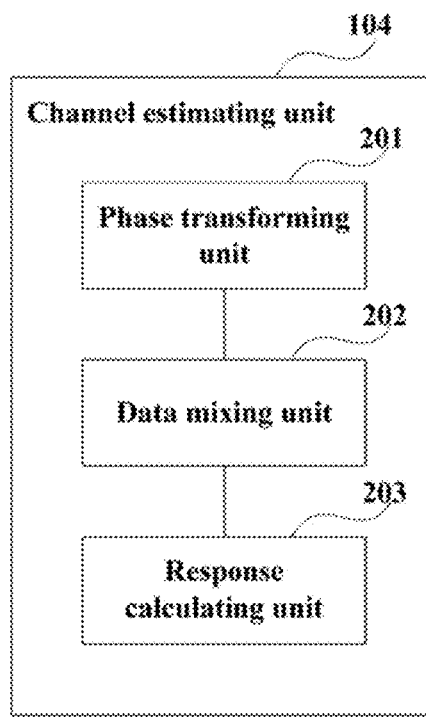
FIG. 2 is a schematic diagram of a channel estimating unit according to Embodiment 1 of this disclosure.

FIG. 2 is a schematic diagram of the channel estimating unit according to the embodiment of this disclosure. As shown in FIG. 2, the channel estimating unit 104 may include:

a phase transforming unit 201 configured to transform the sampling phase $\phi$ into $e^{j\phi}$ and $e^{-j\phi}$;

a data mixing unit 202 configured to calculate the estimation signal $tx(e^{j\phi}+e^{-j\phi})$ after passing through a channel and being aliased based on the transformed sampling phase and the training sequence tx; and a response calculating unit 203 configured to calculate the channel response and the aliasing signal response of each subcarrier of the multicarrier signal based on the frequency-domain signal rx and the estimation signal $tx(e^{j\phi}+e^{-j\phi})$.

For example, the response calculating unit 203 may calculate by using the formula below:

$$\begin{bmatrix} tx_1 e^{j\phi_1} & tx_1 e^{-j\phi_1} \\ tx_2 e^{j\phi_2} & tx_2 e^{-j\phi_2} \\ \vdots & \vdots \end{bmatrix} \times \begin{bmatrix} h_1 \\ h_2 \end{bmatrix} = \begin{bmatrix} rx_1 \\ rx_2 \\ \vdots \end{bmatrix};$$

where, $tx_n$ is the training sequence, $rx_n$ is the frequency-domain signal, $\phi_n$ is the sampling phase, $h_1$ is the channel response, and $h_2$ is the aliasing signal response, n being a positive integer greater than or equal to 2. When sufficient data are collected, $h_1$ and $h_2$ may be calculated by using a matrix division method or an MMSE correlation algorithm.

Figure 3:
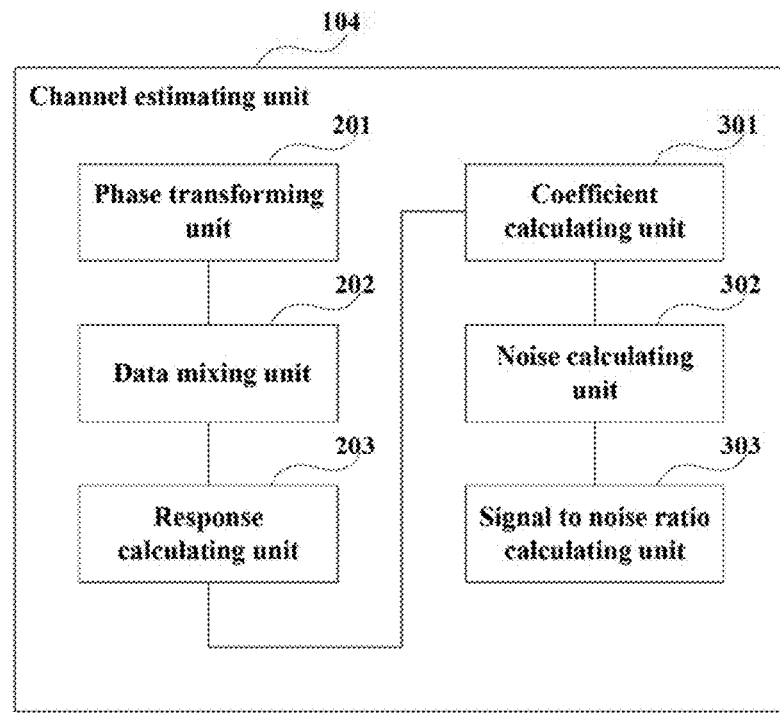
FIG. 3 is another schematic diagram of the channel estimating unit according to Embodiment 1 of this disclosure.

FIG. 3 is another schematic diagram of the channel estimating unit according to the embodiment of this disclosure. As shown in FIG. 3, the channel estimating unit 104 may include a phase transforming unit 201, a data mixing unit 202 and a response calculating unit 203, as described above.

As shown in FIG. 3, the channel estimating unit 104 may further include:

a coefficient calculating unit 301 configured to obtain the equalization coefficient according to the channel response;

a noise calculating unit 302 configured to obtain a channel noise according to the frequency-domain signal, the equalization coefficient and the training sequence; and a signal to noise ratio calculating unit 303 configured to calculate a signal to noise ratio based on the channel noise and the training sequence.

In this embodiment, the coefficient calculating unit 301 may particularly be configured to take a reciprocal of the channel response, and take the obtained value as the equalization coefficient. The noise calculating unit 302 may particularly be configured to multiply the frequency-domain signal by the equalization coefficient, then subtract the obtained value by the training sequence (such as a transmission signal), so as to obtain the channel noise. And the signal to noise ratio calculating unit 303 may particularly be configured to obtain the SNR by using an existing formula for calculating an SNR based on the channel noise and the training sequence.

In this way, not only the channel response and the aliased signal response of each subcarrier of the multicarrier signal may be obtained, but also the noise strength of each subcarrier may be obtained, thereby more accurately determining an optimal modulation format and power allocation of each subcarrier.

Figure 4:
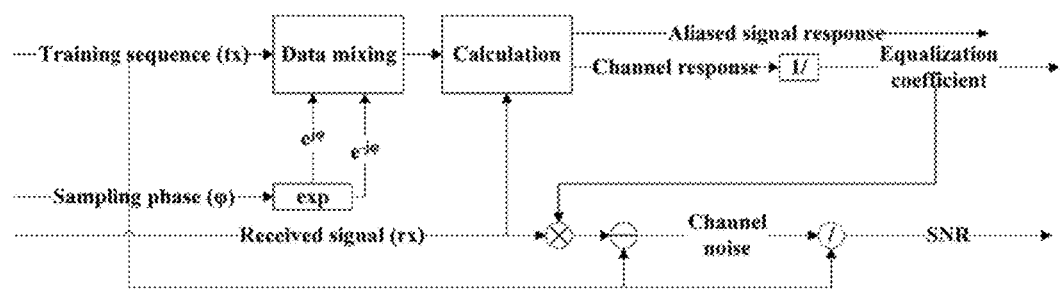
FIG. 4 is a further schematic diagram of the channel estimating unit according to Embodiment 1 of this disclosure.

FIG. 4 is a further schematic diagram of the channel estimating unit according to the embodiment of this disclosure, showing by way of an example how to perform channel estimation. As shown in FIG. 4, influences of a change of a phase on the channel and the aliased signal may be calculated according to inputted information on the sampling phase, a form of the transmission signal after passing through the channel and being aliased may be calculated, and then an operation (such as matrix left division) is performed together with a corresponding received signal, so as to obtain the channel response and the aliased signal response.

As shown in FIG. 4, a reciprocal of the channel response may be taken, so as to obtain the equalization coefficient; the frequency-domain signal may be multiplied by the equalization coefficient and subtracted by the transmission signal, so as to obtain the channel noise. And furthermore, the signal to noise ratio of the channel may be calculated.

Figure 5:
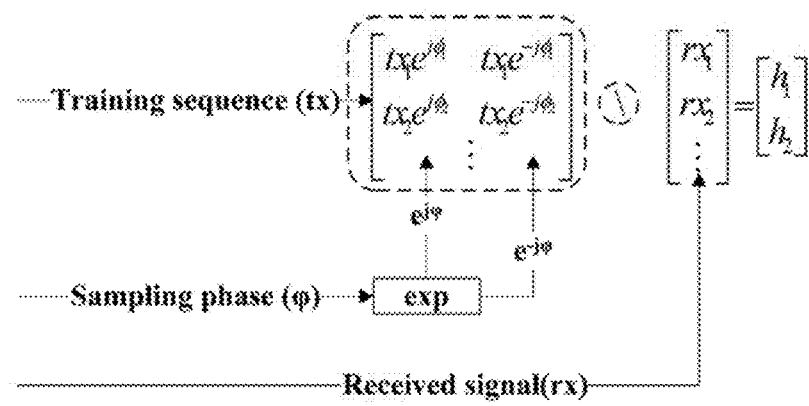
FIG. 5 is a schematic diagram of mathematical description of channel estimation according to Embodiment 1 of this disclosure.

FIG. 5 is a schematic diagram of mathematical description of channel estimation according to the embodiment of this disclosure. As shown in FIG. 5, assuming that the channel response and the aliased signal response are $h_1$ and $h_2$ respectively, for each group of transceiving data $tx_n$ and $tx_n$, there exists an expression as below;

$$tx_n(h_1 e^{j\phi_n} + h_2 e^{-j\phi_n}) = rx_n,$$

that is, $$\begin{bmatrix} tx_1 e^{j\phi_1} & tx_1 e^{-j\phi_1} \\ tx_2 e^{j\phi_2} & tx_2 e^{-j\phi_2} \\ \vdots & \end{bmatrix} \times \begin{bmatrix} h_1 \\ h_2 \end{bmatrix} = \begin{bmatrix} rx_1 \\ rx_2 \\ \vdots \end{bmatrix}.$$

Hence, when sufficient data are collected, $h_1$ and $h_2$ may be calculated by using the matrix division method or the MMSE related algorithms.

It should be note that FIG. 4 and FIG. 5 only illustratively show an example of the channel estimation. However, this disclosure is not limited thereto, and suitable modification or adjustment may be made, for example.

The units or modules of this disclosure are illustrated above, and the performance of this disclosure shall be illustrated below.

In this embodiment, when sampling frequencies of the multicarrier signal with channel aliasing are unmatched between the transmitting device and the receiving device (that is, clock offset exists), a bit error ratio (BER) of the system is lower than a predetermined value; and when the sampling frequencies of the multicarrier signal with channel aliasing are matched between the transmitting device and the receiving device (that is, no clock offset exists), with a change of the sampling phase, a change of the BER of the system is lower than a predetermined value.

Figure 6:
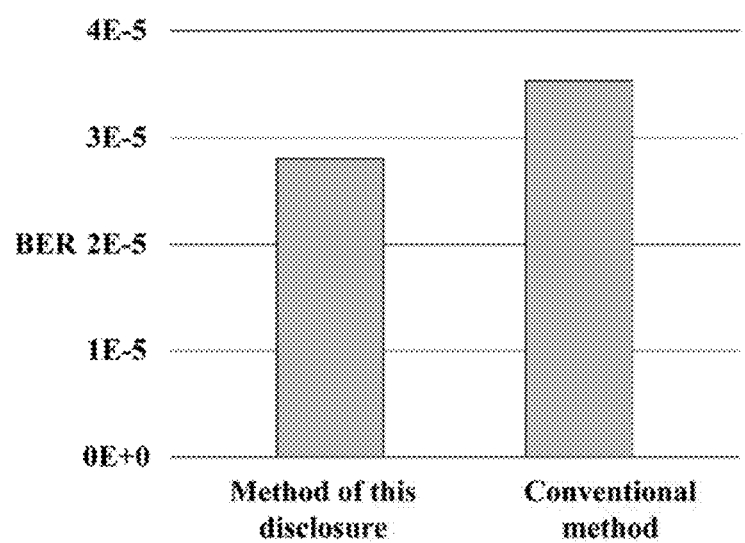
FIG. 6 is a schematic diagram of performance verification according to Embodiment 1 of this disclosure.

FIG. 6 is a schematic diagram of performance verification according to the embodiment of this disclosure, which shows a case of a transmission BER of a multicarrier system with channel aliasing, when sampling frequencies are unmatched between the transmitting device and the receiving device.

As shown in FIG. 6, in this system, a sampling phase of the receiving device changes quite fast relative to the channel estimation, and a BER obtained by using the method according to this disclosure is lower than that obtained by using a conventional method.

Figure 7:
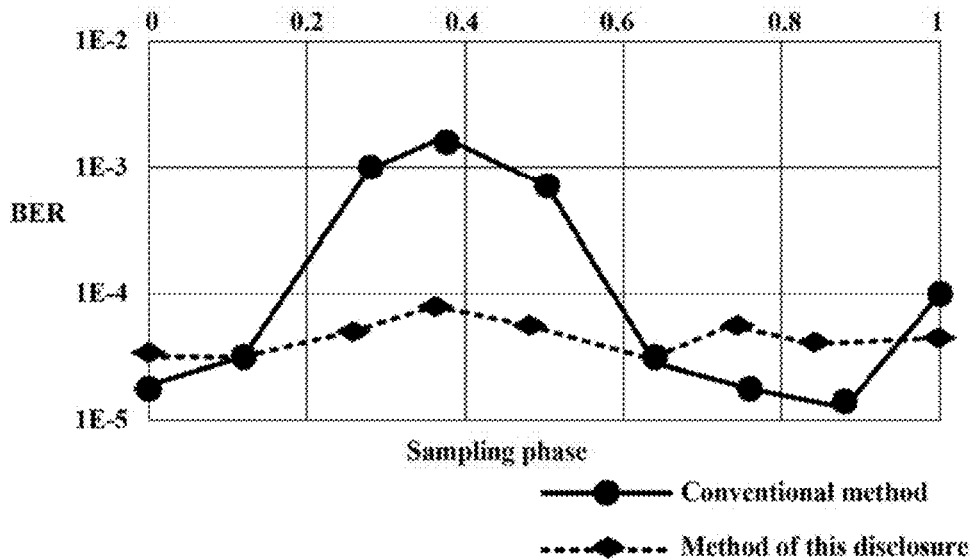
FIG. 7 is another schematic diagram of performance verification according to Embodiment 1 of this disclosure.

FIG. 7 is another schematic diagram of performance verification according to the embodiment of this disclosure, which shows a case of a transmission BER of a multicarrier system with channel aliasing when sampling frequencies are matched between a transmitting device and a receiving device. Before intervening in the system, the sampling phase of the receiving device is kept constant. And after an equalization coefficient is measured at a specific sampling phase, the sampling phase of the receiving device is changed.

As shown in FIG. 7, with the change of the sampling phase, in a multicarrier system using a conventional method, jitter of the transmission BER is great; in a multicarrier system using the method according to the disclosure, jitter of the transmission BER is small. Regarding the change of the transmission BER, the method of this disclosure is less than a conventional method by an order of magnitude.

It can be seen from FIG. 6 and FIG. 7 that when the clock has/does not have a frequency offset, the influence of the channel aliasing on the BER may all be reduced by using the method according to this disclosure.

It can be seen from the above embodiment that the channel response and the aliasing signal response of each subcarrier of the multicarrier signal are calculated based on the sample phase. Therefore, channel estimation may be performed accurately on the multicarrier signal with channel aliasing, influence of the channel aliasing on the bit error rate may be lowered, and transmission quality of the system may be improved.

Embodiment 2

The embodiment of this disclosure provides an anti-aliasing channel estimation method, with the contents identical to those in Embodiment 1 being not going to be described herein any further.

Figure 8:
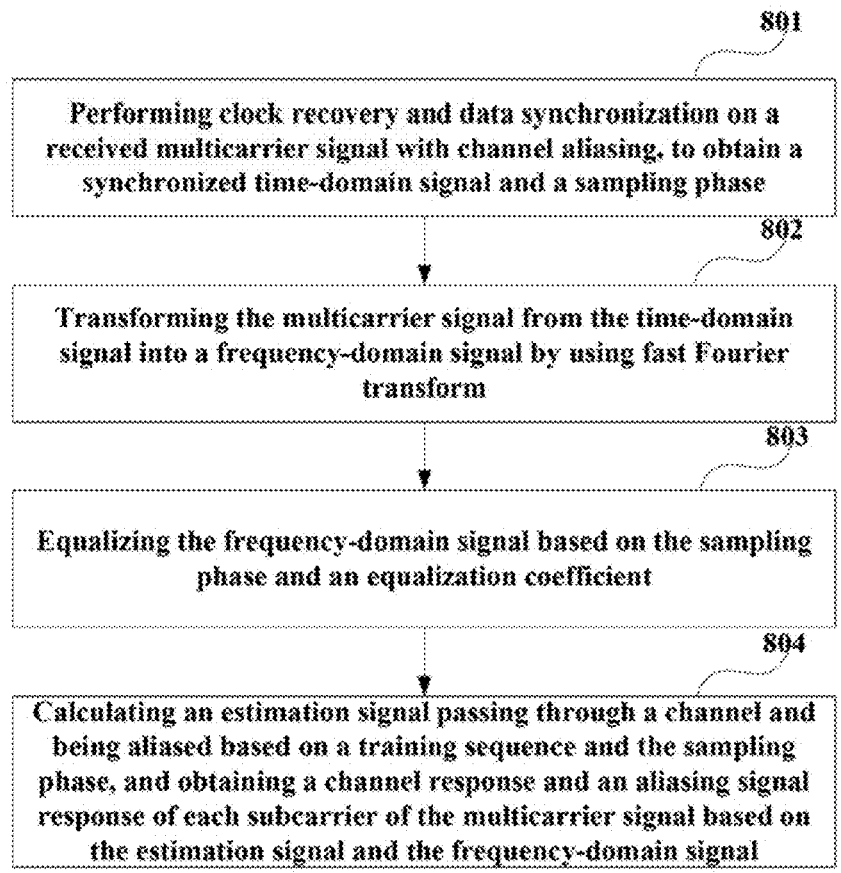
FIG. 8 is a flowchart of the anti-aliasing channel estimation method according to Embodiment 2 of this disclosure.

FIG. 8 is a flowchart of the anti-aliasing channel estimation method according to the embodiment of this disclosure. As shown in FIG. 8, the anti-aliasing channel estimation method includes:

step 801: performing clock recovery and data synchronization on a received multicarrier signal with channel aliasing, to obtain a synchronized time-domain signal and a sampling phase;

step 802: transforming the multicarrier signal from the time-domain signal into a frequency-domain signal by using FFT;

step 803: equalizing the frequency-domain signal based on the sampling phase and an equalization coefficient; and step 804: calculating an estimation signal passing through a channel and being aliased based on a training sequence and the sampling phase, and obtaining a channel response and an aliasing signal response of each subcarrier of the multicarrier signal based on the estimation signal and the frequency-domain signal.

Figure 9:
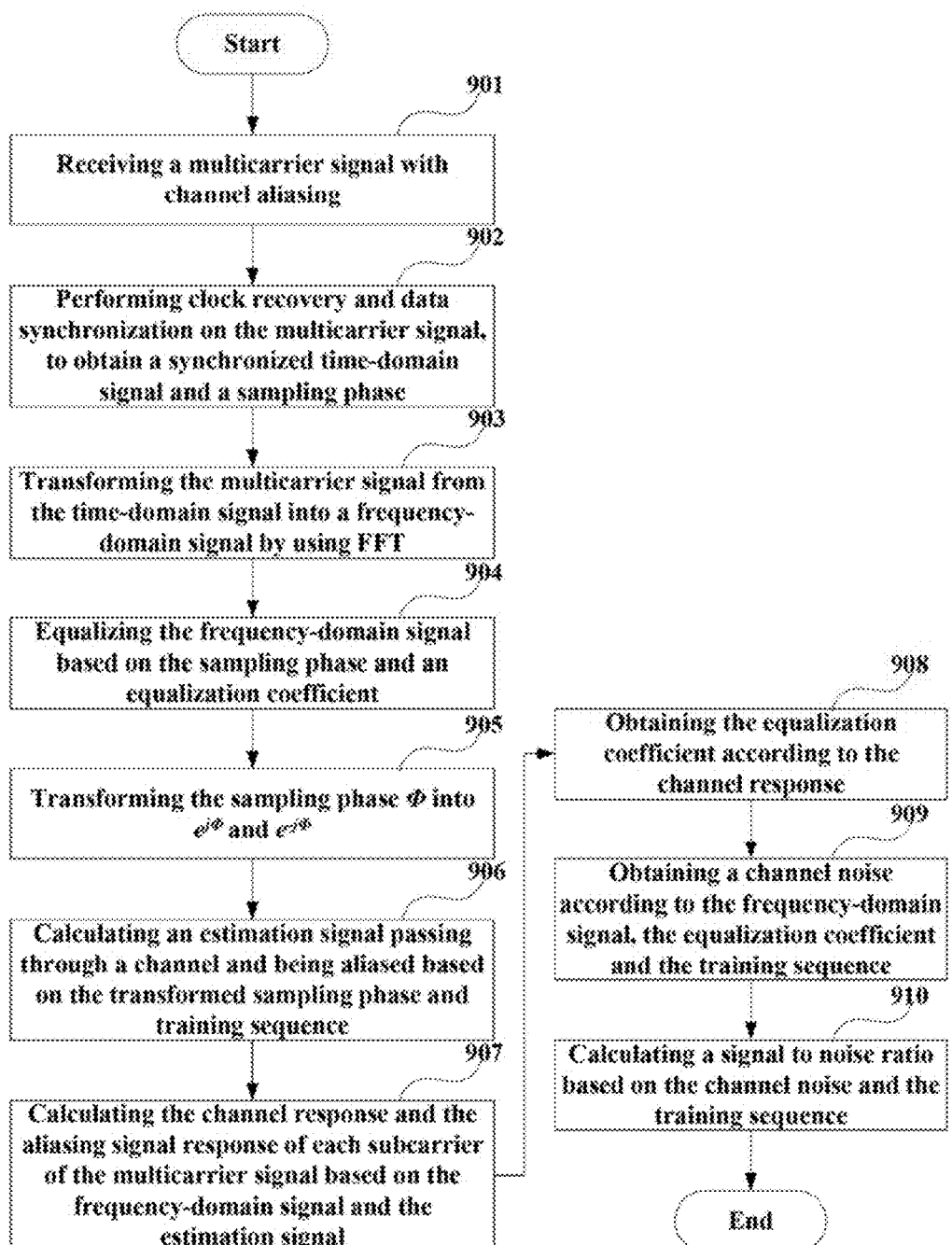
FIG. 9 is another flowchart of the anti-aliasing channel estimation method according to Embodiment 2 of this disclosure.

FIG. 9 is another flowchart of the anti-aliasing channel estimation method according to the embodiment of this disclosure. As shown in FIG. 9, the channel estimation method includes:

step 901: receiving a multicarrier signal with channel aliasing;

step 902: performing clock recovery and data synchronization on the multicarrier sign to obtain a synchronized time-domain signal and a sampling phase;

step 903: transforming the multicarrier signal from the time-domain signal into a frequency-domain signal by using FFT;

step 904: equalizing the frequency-domain signal based on the sampling phase and an equalization coefficient;

step 905: transforming the sampling phase $\phi$ into $e^{j\phi}$ and $e^{-j\phi}$;

step 906: calculating the estimation signal $tx(e^{j\phi}+e^{-j\phi})$ after passing through a channel and being, aliased based on the transformed sampling phase and the training sequence tx;

step 907: calculating the channel response and the aliasing signal response of each subcarrier of the multicarrier signal based on the frequency-domain signal rx and the estimation signal $tx(e^{j\phi}+e^{-j\phi})$.

As shown in FIG. 9, the channel estimation method may further include:

step 908: obtaining the equalization coefficient according to the channel response;

step 909: obtaining a channel noise according to the frequency-domain signal, the equalization coefficient and the training sequence; and step 910: calculating a signal to noise ratio based on the channel noise and the training sequence.

It should be noted that the embodiment of the present disclosure is only illustrated in FIG. 8 and FIG. 9. However, the present disclosure is not limited thereto; for example, an order of executing the steps may be suitably adjusted, and furthermore, some other steps may be added or some of these steps may be reduced. And suitable modification may be made by those skilled in the art according to the above contents, without being limited to what is contained in the above drawings.

It can be seen from the above embodiment that the channel response and the aliasing signal response of each subcarrier of the multicarrier signal are calculated based on the sampling phase. Therefore, channel estimation may be performed accurately on the multicarrier signal with channel aliasing, influence of the channel aliasing on the bit error rate may be lowered, and transmission quality of the system may be improved.

Embodiment 3

The embodiment of this disclosure provides a receiver of a multicarrier system, which receives a multicarrier signal with channel aliasing, the receiver comprising the anti-aliasing channel estimation apparatus 100 according to Embodiment 1.

Figure 10:
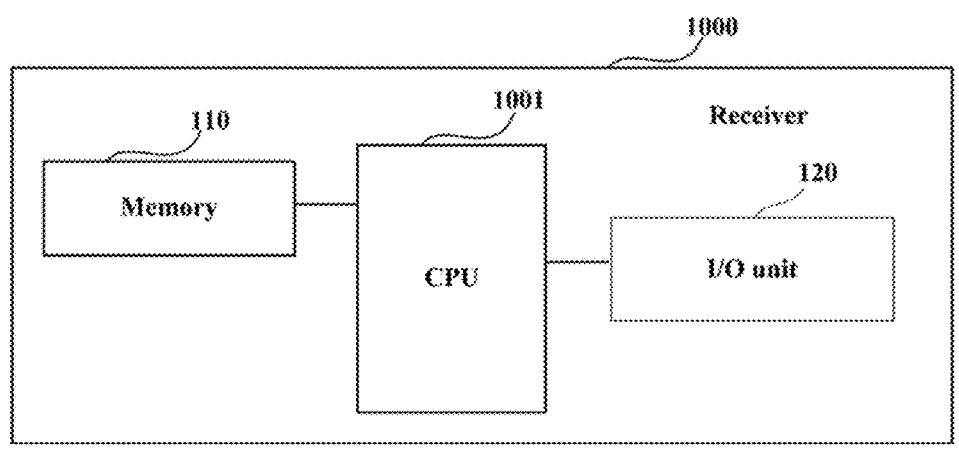
FIG. 10 is a schematic diagram of the receiver according to Embodiment 3 of this disclosure.

FIG. 10 is a schematic diagram of the receiver of the embodiment of this disclosure. As shown in FIG. 10, the receiver 1000 may include a central processing unit (CPU) 1001 and a memory 110, the memory 110 being coupled to the central processing unit 1001. The memory 110 may store various data, and furthermore, it may store a program for information processing, and the program may be executed under control of the central processing unit 1001.

In an implementation, the functions of the anti-aliasing channel estimation apparatus 100 may be integrated into the central processing unit 1001. The central processing unit 1001 may be configured to carry out the anti-aliasing channel estimation method according to Embodiment 2.

For example, the central processing unit 1001 may be configured to perform the following control; performing clock recovery and data synchronization on a received multicarrier signal with channel aliasing, to obtain a synchronized time-domain signal and a sampling phase; transforming the multicarrier signal from the time-domain signal into a frequency-domain signal by using FFT; equalizing the frequency-domain signal based on the sampling phase and an equalization coefficient; calculating the estimation signal after passing through a channel and being aliased based on the transformed sampling phase and the training sequence; and calculating the channel response and the aliasing signal response of each subcarrier of the multicarrier signal based on the frequency-domain signal and the estimation signal.

In another implementation, the anti-aliasing channel estimation apparatus 100 and the central processing unit 1001 may be configured separately. For example, the anti-aliasing channel estimation apparatus 100 may be configured as a chip connected to the central processing unit 1001, with its functions being realized under control of the central processing unit 1001.

Furthermore, as shown in FIG. 10, the receiver 1000 may further include an input/output unit 120, etc. Functions of the above components are similar to those in the relevant art, and shall not be described herein any further. It should be noted that the receiver 1000 does not necessarily include all the parts shown in FIG. 10, and furthermore, the receiver 1000 may include parts not shown in FIG. 10, and the relevant art may be referred to.

An embodiment of the present disclosure provides a computer readable program code, which, when executed in a receiver, will cause the receiver to carry out the anti-aliasing channel estimation method according to Embodiment 2.

An embodiment of the present disclosure provides a computer readable medium, including a computer readable program code, which will cause a receiver to carry out the anti-aliasing channel estimation method according to Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. An anti-aliasing channel estimation apparatus, including:

a synchronizing unit configured to perform clock recovery and data synchronization on a received multicarrier signal with channel aliasing, to obtain a synchronized time-domain signal and a sampling phase;

a signal transforming unit configured to transform the multicarrier signal from the time-domain signal into a frequency-domain signal by using fast Fourier transform;

an equalizing unit configured to equalize the frequency-domain signal based on the sampling phase and an equalization coefficient; and a channel estimating unit configured to calculate an estimation signal after passing through a channel and being aliased based on a training sequence and the sampling phase, and obtain a channel response and an aliasing signal response of each subcarrier of the multicarrier signal based on the estimation signal and the frequency-domain signal.

Supplement 2. The channel estimation apparatus according to supplement 1, wherein the channel estimating unit includes:

a phase transforming unit configured to transform the sampling phase $\phi$ into $e^{j\phi}$ and $e^{-j\phi}$;

a data mixing unit configured to calculate the estimation signal $tx(e^{j\phi}+e^{-j\phi})$ after passing through a channel and being aliased based on the transformed sampling phase and the training sequence tx; and a response calculating unit configured to calculate the channel response and the aliasing signal response of each subcarrier of the multicarrier signal based on the frequency-domain signal rx and the estimation signal $tx(e^{j\phi}+e^{-j\phi})$.

Supplement 3. The channel estimation apparatus according to supplement 2, wherein the channel estimating unit further includes:

a coefficient calculating unit configured to obtain the equalization coefficient according to the channel response;

a noise calculating unit configured to obtain a channel noise according to the frequency-domain signal, the equalization coefficient and the training sequence; and a signal to noise ratio calculating unit configured to calculate a signal to noise ratio based on the channel noise and the training sequence.

Supplement 4. The channel estimation apparatus according to supplement 3, wherein the noise calculating unit is configured to obtain the channel noise by multiplying the frequency-domain signal by the equalization coefficient and subtracted by the training sequence.

Supplement 5. The channel estimation apparatus according to supplement 2, wherein the response calculating unit is configured to perform calculation by using a formula below:

$$\begin{bmatrix} tx_1 e^{j\phi_1} & tx_1 e^{-j\phi_1} \\ tx_2 e^{j\phi_2} & tx_2 e^{-j\phi_2} \\ \vdots & \end{bmatrix} \times \begin{bmatrix} h_1 \\ h_2 \end{bmatrix} = \begin{bmatrix} rx_1 \\ rx_2 \\ \vdots \end{bmatrix};$$

where, $tx_n$ is the training sequence, $rx_n$ is the frequency-domain signal, $\phi_n$ is the sampling phase, $h_1$ is the channel response, and $h_2$ is the aliasing signal response.

Supplement 6. The channel estimation apparatus according to supplement 5, wherein the response calculating unit is configured to obtain the channel response $h_1$ and the aliasing signal response $h_2$ by using a matrix division method or a minimum mean square error algorithm.

Supplement 7. The channel estimation apparatus according to supplement 1, wherein when sampling frequencies of the multicarrier signal with channel aliasing are unmatched between a transmitting device and a receiving device (that is, clock offset exists), a bit error ratio of the system is lower than a predetermined value;

and when the sampling frequencies of the multicarrier signal with channel aliasing are matched between the transmitting device and the receiving device (that is, no clock offset exists), a change of the bit error ratio of the system is lower than a predetermined value.

Supplement 8. An anti-aliasing channel estimation method, including:

performing clock recovery and data synchronization on a received multicarrier signal with channel aliasing, to obtain a synchronized time-domain signal and a sampling phase;

transforming the multicarrier signal from the time-domain signal into a frequency-do n signal by using fast Fourier transform;

equalizing the frequency-domain signal based on the sampling phase and an equalization coefficient; and calculating an estimation signal after passing through a channel and being aliased based on a training sequence and the sampling phase, and obtaining a channel response and an aliasing signal response of each subcarrier of the multicarrier signal based on the estimation signal and the frequency-domain signal.

Supplement 9. The channel estimation method according to supplement 8, wherein the calculating an estimation signal passing through a channel and being aliased based on a training sequence and the sampling phase, and obtaining a channel response and an aliasing signal response of each subcarrier of the multicarrier signal based on the estimation signal and the frequency-domain signal, includes:

transforming the sampling phase $\phi$ into $e^{j\phi}$ and $e^{-j\phi}$;

calculating the estimation signal $tx(e^{j\phi}+e^{-e\phi})$ after passing through a channel and being aliased based on the transformed sampling phase and the training sequence tx;

calculating the channel response and the aliasing signal response of each subcarrier of the multicarrier signal based on the frequency-domain signal rx and the estimation signal $tx(e^{j\phi}+e^{-j\phi})$.

Supplement 10. The channel estimation method according to supplement 9, wherein the method further includes:

obtaining the equalization coefficient according to the channel response;

obtaining a channel noise according to the frequency-domain signal, the equalization coefficient and the training sequence; and calculating a signal to noise ratio based on the channel noise and the training sequence.

Supplement 11. The channel estimation method according to supplement 10, wherein the obtaining a channel noise according to the frequency-domain signal, the equalization coefficient and the training sequence, includes:

obtaining the channel noise by multiplying the frequency-domain signal by the equalization coefficient and subtracted by the training sequence.

Supplement 12. The channel estimation method according to supplement 9, wherein a formula below is used to perform the calculation:

$$\begin{bmatrix} tx_1 e^{j\phi_1} & tx_1 e^{-j\phi_1} \\ tx_2 e^{j\phi_2} & tx_2 e^{-j\phi_2} \\ \vdots & \end{bmatrix} \times \begin{bmatrix} h_1 \\ h_2 \end{bmatrix} = \begin{bmatrix} rx_1 \\ rx_2 \\ \vdots \end{bmatrix};$$

where, $tx_n$ is the training sequence, $rx_n$ is the frequency-domain signal, $\phi_n$ is the sampling phase, $h_1$ is the channel response, and $h_2$ is the aliasing signal response.

Supplement 13. The channel estimation method according to supplement 12, wherein the channel response $h_1$ and the aliasing signal response $h_2$ are obtained by using a matrix division method or a minimum mean square error algorithm.

Supplement 14. The channel estimation method according to supplement 8, wherein when sampling frequencies of the multicarrier signal with channel aliasing are unmatched between a transmitting device and a receiving device (that is, clock offset exists), a bit error ratio of the system is lower than a predetermined value;

and when the sampling frequencies of the multicarrier signal with channel aliasing are matched between the transmitting device and the receiving device (that is, no clock offset exists), a change of the bit error ratio of the system is lower than a predetermined value.

Supplement 16. A receiver of a multicarrier system, which receives a multicarrier signal with channel aliasing, the receiver including the anti-aliasing channel estimation apparatus according to any one of supplements 1-7.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An anti-aliasing channel estimation apparatus, comprising:

a processor configured to execute instructions to:

perform clock recovery and data synchronization on a received multicarrier signal with channel aliasing, to obtain a synchronized time-domain signal and a sampling phase;

transform the multicarrier signal from the time-domain signal into a frequency-domain signal by using a fast Fourier transform;

equalize the frequency-domain signal based on the sampling phase and an equalization coefficient; and calculate an estimation signal after the multicarrier signal passing through a channel and being aliased based on a training sequence and the sampling phase, and obtain a channel response and an aliasing signal response of each subcarrier of the multicarrier signal based on the estimation signal and the frequency-domain signal.

2. The channel estimation apparatus according to claim 1, wherein the processor is configured to execute the instructions to:

transform sampling phase $\phi$ into $e^{j\phi}$ and $e^{-j\phi}$;

calculate estimation signal $tx(e^{j\phi}+e^{-j\phi})$ after passing through a channel and being aliased based on a transformed sampling phase and training sequence tx; and calculate the channel response and the aliasing signal response of each subcarrier of the multicarrier signal based on frequency-domain signal rx and the estimation signal $tx(e^{j\phi}+e^{-j\phi})$.

3. The channel estimation apparatus according to claim 2, wherein the processor is configured to execute the instructions to:

obtain the equalization coefficient according to the channel response;

obtain channel noise according to the frequency-domain signal, the equalization coefficient and the training sequence; and calculate a signal to noise ratio based on the channel noise and the training sequence.

4. The channel estimation apparatus according to claim 3, wherein the processor is configured to execute the instructions to obtain the channel noise by multiplying the frequency-domain signal by the equalization coefficient and subtract the training sequence.

5. The channel estimation apparatus according to claim 2, wherein the processor is configured to execute the instructions to perform calculation by using a formula below:

$$\begin{bmatrix} tx_1 e^{j\phi_1} & tx_1 e^{-j\phi_1} \\ tx_2 e^{j\phi_2} & tx_2 e^{-j\phi_2} \\ \vdots & \end{bmatrix} \times \begin{bmatrix} h_1 \\ h_2 \end{bmatrix} = \begin{bmatrix} rx_1 \\ rx_2 \\ \vdots \end{bmatrix};$$

where, $tx_n$ is the training sequence, $rx_n$ is the frequency-domain signal, $\phi_n$ is the sampling phase, $h_1$ is the channel response, and $h_2$ is the aliasing signal response.

6. The channel estimation apparatus according to claim 5, wherein the processor is configured to execute the instructions to obtain the channel response $h_1$ and the aliasing signal response $h_2$ using one of a matrix division method and a minimum mean square error algorithm.

7. An anti-aliasing channel estimation method, comprising:
   performing clock recovery and data synchronization on a received multicarrier signal with channel aliasing, to obtain a synchronized time-domain signal and a sampling phase;
   transforming the multicarrier signal from the time-domain signal into a frequency-domain signal by using fast Fourier transform;
   equalizing the frequency-domain signal based on the sampling phase and an equalization coefficient; and
   calculating an estimation signal after the multicarrier signal passing through a channel and being aliased based on a training sequence and the sampling phase, and obtaining a channel response and an aliasing signal response of each subcarrier of the multicarrier signal based on the estimation signal and the frequency-domain signal.

8. The channel estimation method according to claim 7, wherein the calculating an estimation signal passing through a channel and being aliased based on a training sequence and the sampling phase, and obtaining a channel response and an aliasing signal response of each subcarrier of the multicarrier signal based on the estimation signal and the frequency-domain signal, comprises:
   transforming sampling phase $\phi$ into $e^{j\phi}$ and $e^{-j\phi}$;
   calculating estimation signal $tx(e^{j\phi}+e^{-j\phi})$ after passing through a channel and being aliased based on a transformed sampling phase and training sequence tx;
   calculating the channel response and the aliasing signal response of each subcarrier of the multicarrier signal based on frequency-domain signal rx and the estimation signal $tx(e^{j\phi}+e^{-j\phi})$.

9. The channel estimation method according to claim 8, wherein the channel estimation method further comprises:
   obtaining the equalization coefficient according to the channel response;
   obtaining channel noise according to the frequency-domain signal, the equalization coefficient and the training sequence; and
   calculating a signal to noise ratio based on the channel noise and the training sequence.

10. A receiver of a multicarrier system, which is configured to receive a multicarrier signal with channel aliasing, characterized in that the receiver comprises the anti-aliasing channel estimation apparatus according to claim 1.

* * * * *